(12) United States Patent
Lee et al.

(10) Patent No.: US 6,538,349 B1
(45) Date of Patent: Mar. 25, 2003

(54) LINEAR RECIPROCATING FLUX REVERSAL PERMANENT MAGNETIC MACHINE

(76) Inventors: Ju Lee, Department of Eletrical Engineering, Hanyang University, Haengdang-Dong, Seongdong-Gu, Seoul, 133-791 (KR); Tae-Bin Im, Motor-Net, Puchon-Technopark #203-101, 192 Yakae-Dong, Wonmi-Gu, Puchon-Si, Kyunggi-Do, 420-733 (KR); Ion Boldea, University of Politehnica of Timisoara, Romania, 54 Brancoveanu str., 1900, Timisoara (RO)

( * ) Notice: Subject to any disclaimer, the term of this patent is extended or adjusted under 35 U.S.C. 154(b) by 0 days.

(21) Appl. No.: 10/266,668

(22) Filed: Oct. 9, 2002

(30) Foreign Application Priority Data

Sep. 12, 2002 (KR) ............................................ 02-55367

(51) Int. Cl.⁷ .............................................. H02K 33/00
(52) U.S. Cl. ....................................................... 310/15
(58) Field of Search ................................ 335/229–234; 310/12–39

(56) References Cited

U.S. PATENT DOCUMENTS 3,366,809 A * 1/1968 Scott ............................ 310/15
4,349,757 A * 9/1982 Bhate .......................... 360/15
4,827,163 A * 5/1989 Bhate et al. .................. 310/15
4,937,481 A * 6/1990 Vitale .......................... 310/15

* cited by examiner

Primary Examiner—Ramon M. Barrera
(74) Attorney, Agent, or Firm—Greenblum & Bernstein, P.L.C.

(57) ABSTRACT

Disclosed herein is a linear reciprocating flux reversal Permanent Magnetic (PM) machine in which stators are provided with air gap sections and interpole sections and magnets are inserted into a mover. The linear reciprocating flux reversal PM machine, comprises a pair of stators arranged to be opposite to each other, the stators each having two coils wound in opposite directions, and air gap sections and interpole sections alternately arranged on inside portions of the stator in a crosswise direction of the stator with the air gap sections of a first stator opposite to interpole sections of a second stator; a mover disposed between the stators to be reciprocated therebetween, the mover having one or more bar-shaped magnets longitudinally and vertically embedded therein; and a spring for returning the mover to an initial position thereof, the returning spring being connected to one or both ends of the mover.

5 Claims, 6 Drawing Sheets

[FIG. 1]
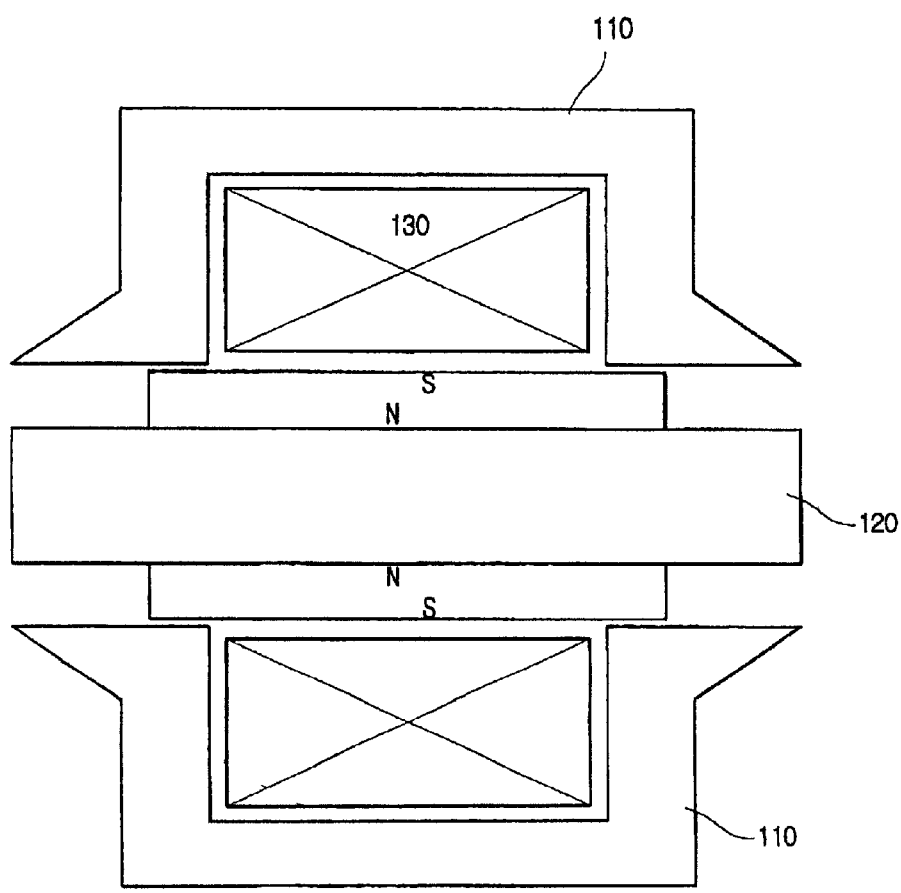

[FIG. 2]
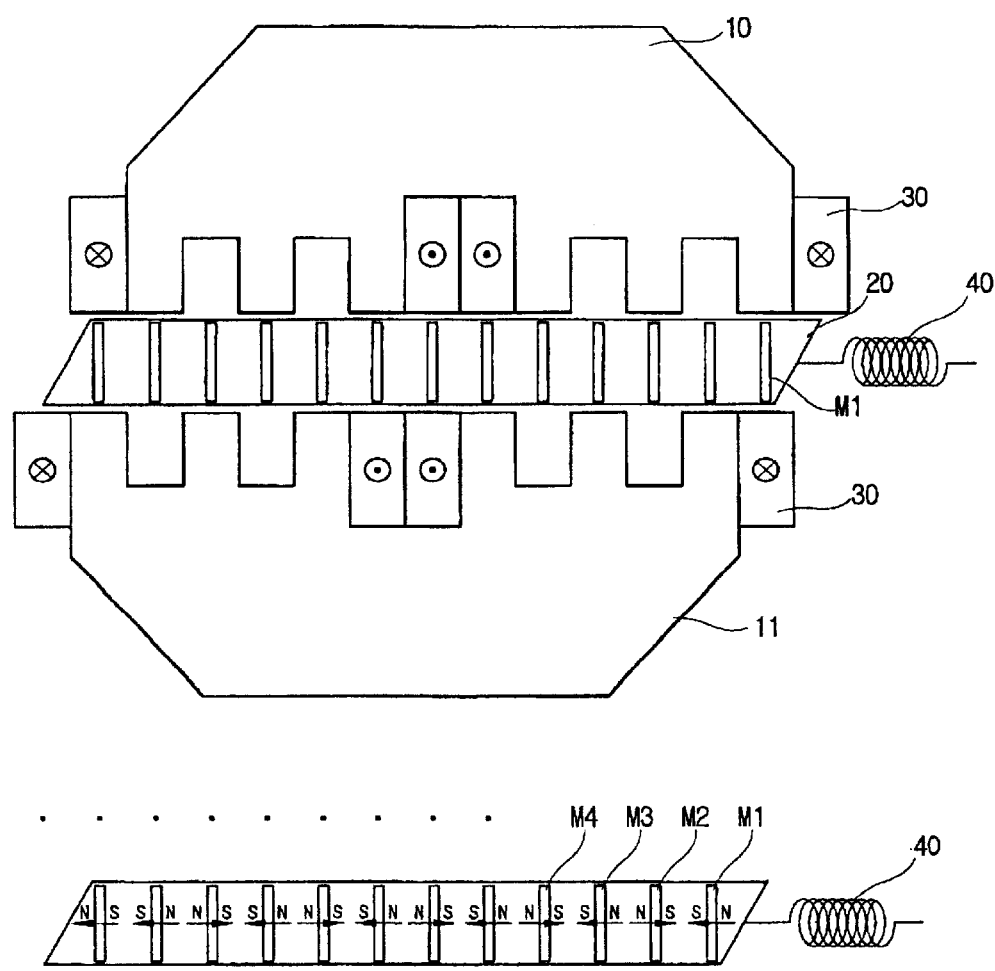

[FIG. 3]
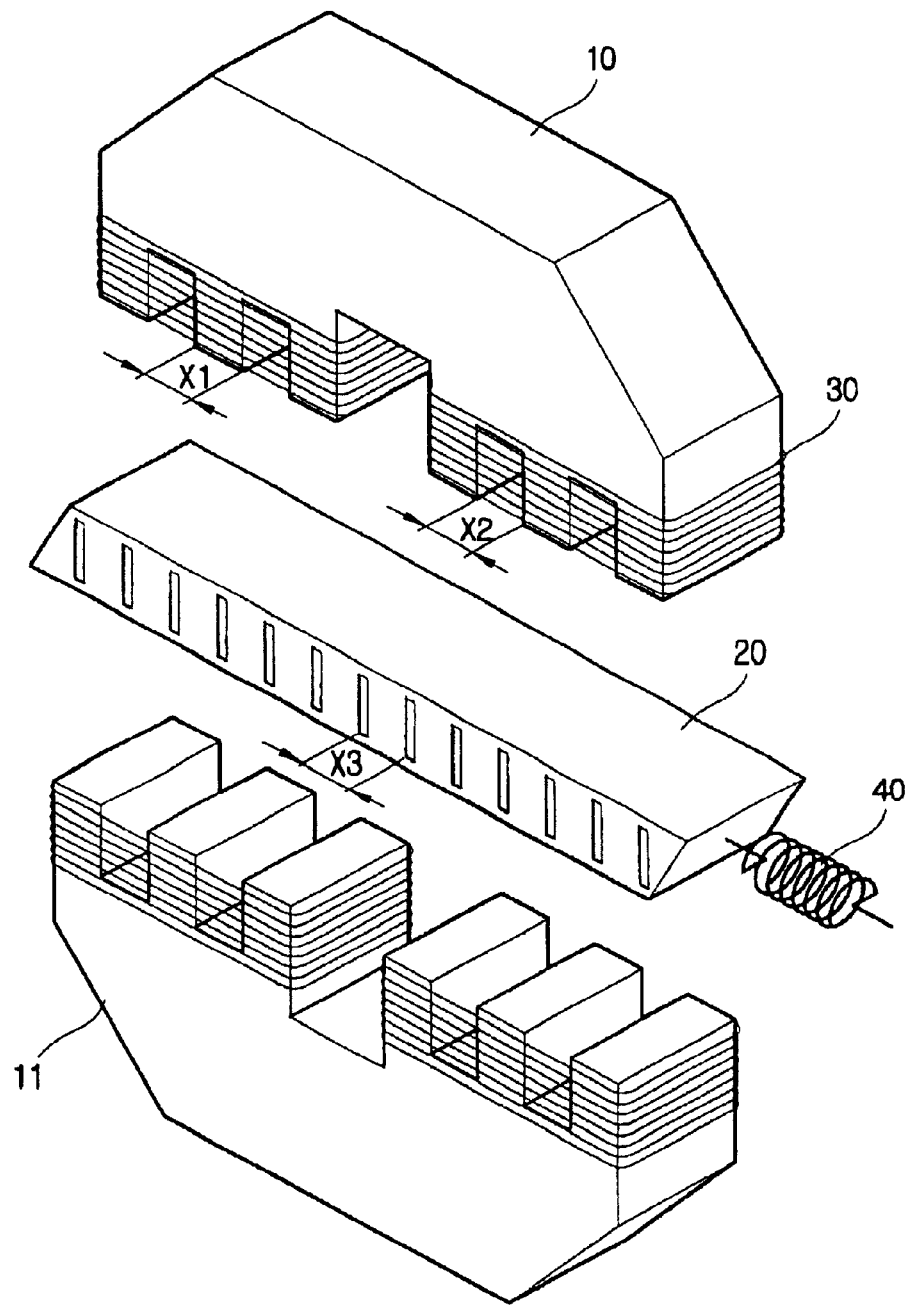

[FIG. 4]
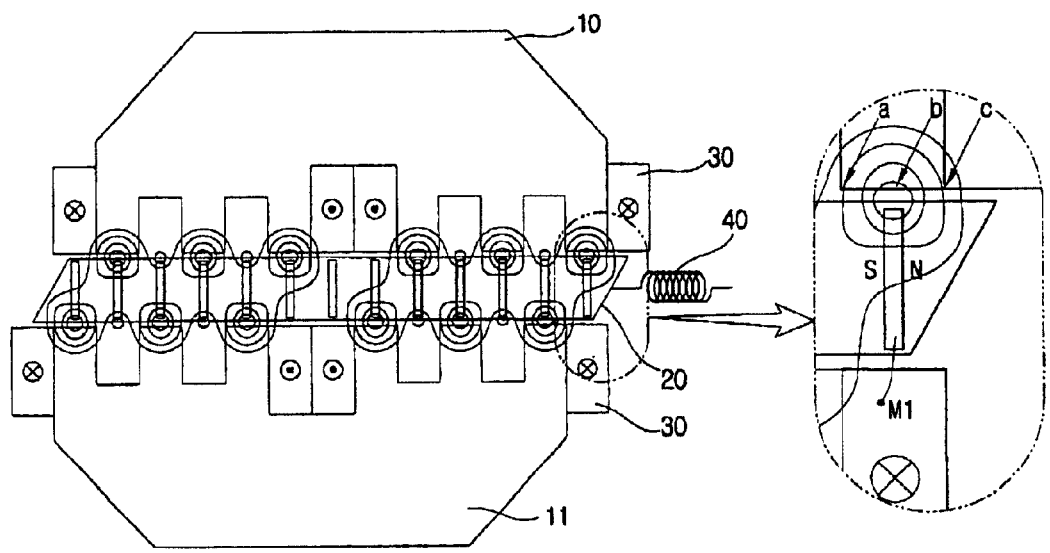
[FIG. 5A]
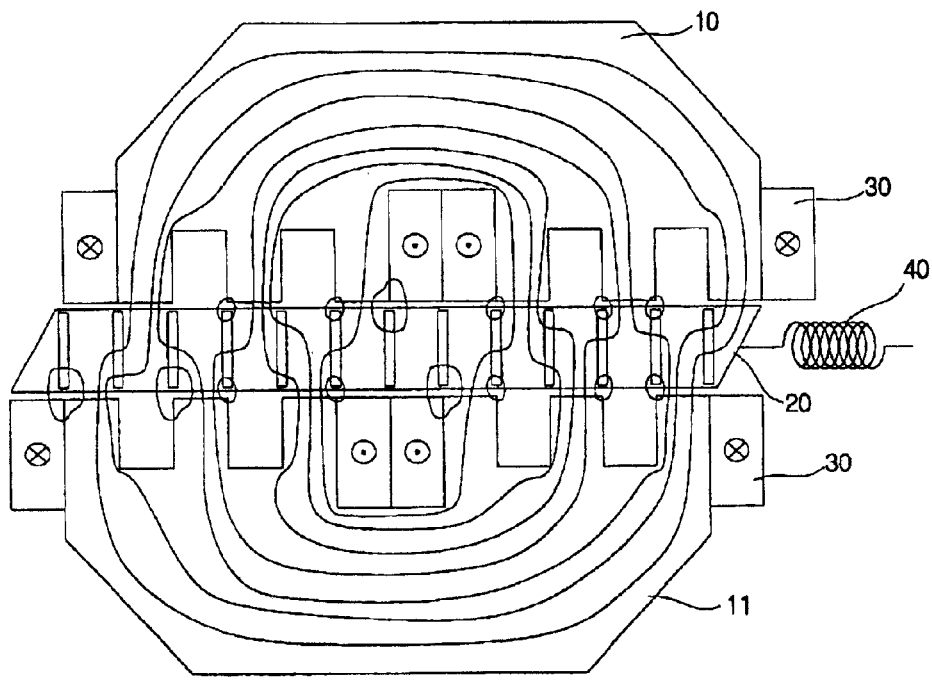

[FIG. 5B]
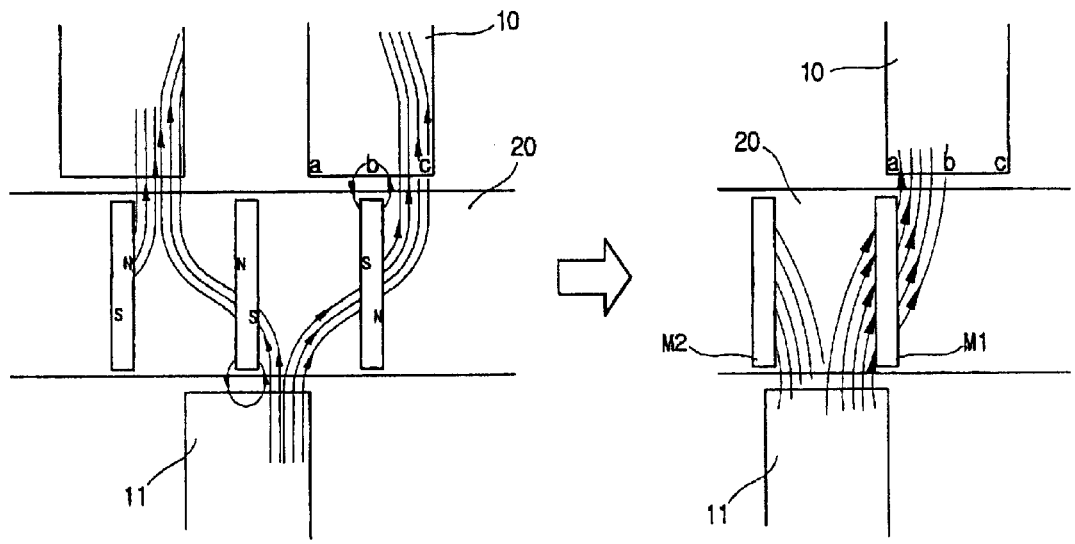
[FIG. 5C]
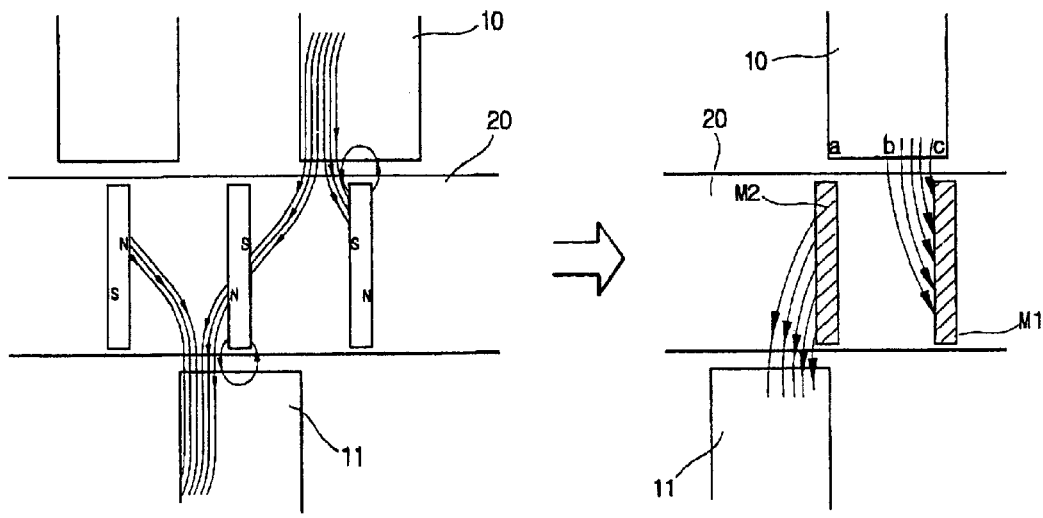

[FIG. 6]
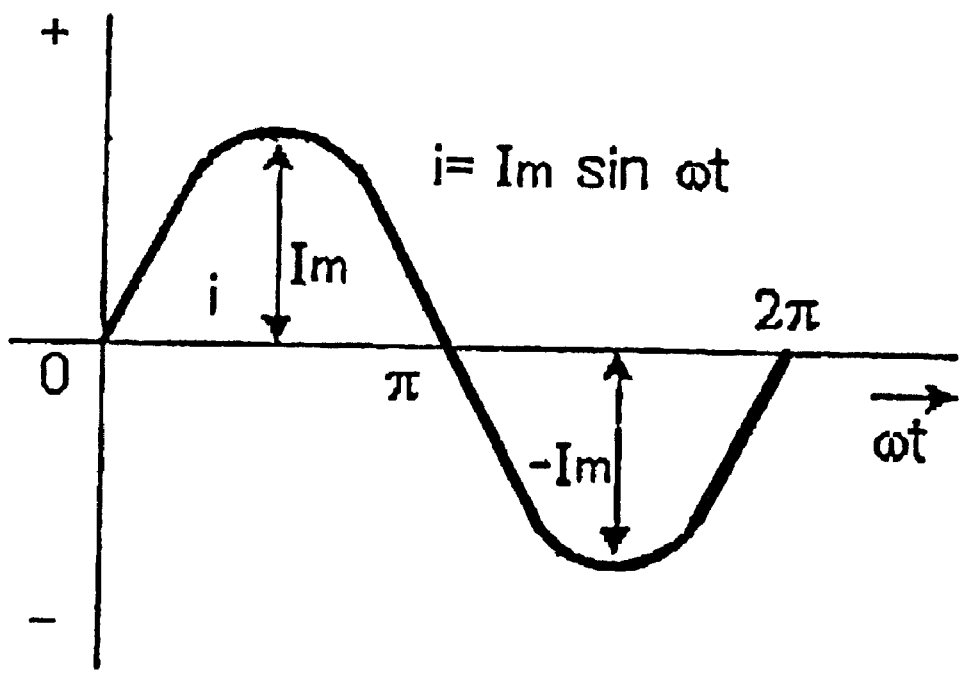

LINEAR RECIPROCATING FLUX REVERSAL PERMANENT MAGNETIC MACHINE

BACKGROUND OF THE INVENTION

1. Field of the Invention

The present invention relates generally to a linear reciprocating flux reversal permanent magnetic machine, and more particularly to a linear reciprocating flux reversal permanent magnetic machine in which stators are provided with air gap sections and interpole sections and magnets are inserted into a mover, thus having high efficiency and being easily manufactured.

2. Description of the Prior Art

In general, a Linear Oscillatory Actuator (LOA) refers to a motor that performs a linear reciprocating motion with a certain stroke at a specific frequency, and is reversely used as a linear generator.

Electromagnetic LOAs can be classified into various types according to a mover and the number of excitation coils. That is, the electromagnetic LOAs are classified into a moving coil type, a moving core type, a moving magnet type, and a moving field type according to a mover. Meanwhile, in order to increase the performance of such an electromagnetic LOA system, a cylindrical structure, a magnet with high energy density, a spring with compressibility under a resonating condition, and a single-phase power source with a constant control frequency are required.

In the case where a long stroke is needed in a low speed range, it is preferable to operate the LOA in a cycle of acceleration, constant velocity and deceleration. In contrast, in the case where a short stroke below 5 cm is needed, it is possible to operate the LOA with a square wave voltage because a cycle of acceleration and deceleration is needed during a reciprocating motion. However, the LOA has to be operated by a Pulse Width Modulation (PWM) inverter that outputs a variable frequency and a variable voltage so as to reduce the harmonic waves of output power and operate the LOA with a frequency and a stroke desired by a system.

As shown in FIG. 1, in the moving magnet type LOA, electromagnets that are excited by current are employed as stators 110 and a magnet is employed as a mover 120. If current flows in the coils 130 in FIG. 1, each stator 110 is magnetized to have an S pole and an N pole, so the mover 120 experiences repulsive and attractive forces and thrust is generated.

Recently, the efficiency of the linear reciprocating flux reversal Permanent Magnet (PM) machine is increased to about 85~93% within an output range of 100 Watts to several hundreds Watts, and the operation of the LOA is optimally performed when a mechanical resonating frequency coincides with a commercial power source frequency.

In the meantime, a mechanical spring, for example, a multiple flexure, used for the reciprocating motion of the mover allows the mechanical resonating frequency to coincide with the commercial power source frequency, and serves as a bearing at the end of the stroke and an energy storage device.

However, the conventional linear reciprocating flux reversal PM machine is disadvantageous in that a large weight is required to achieve the efficiency of 85~93%. In the case where the linear reciprocating flux reversal PM machine has a mechanical resonating frequency of 50 Hz and an amplitude of 20 mm, weight per unit power can range from 25 kg/kW to 30 kg/kW.

Additionally, in the conventional linear reciprocating flux reversal PM machine, the mover performs a high speed reciprocating motion, so the conventional linear reciprocating flux reversal PM machine is disadvantageous in that an adhesive part to fix the magnet to the mover can be easily removed from the mover or be damaged.

Additionally, if a motor is formed to have a cylindrical shape as shown in FIG. 1, the motor has an air gap in axial and radial directions of the mover 120, so coil flux flows to a yoke positioned outside the axis of the mover 120 and the inside of the mover 120 along the axis of the mover 120. Accordingly, a radial laminated core is employed as the mover 120 to reduce iron loss, so the conventional motor is disadvantageous in that its manufacture is difficult and its manufacturing cost is high.

Moreover, the mover 120 needs to be comprised of a magnet and an iron core to strengthen the mover 120. In this case, when the magnet is constructed to surround the circumference of the core as shown in FIG. 1, the weight of the mover is increased, so the conventional motor is disadvantageous in that the range of reciprocating frequencies is restricted to several Hz.

SUMMARY OF THE INVENTION

Accordingly, in order to solve the above problems occurring in the prior art, an object of the present invention is to provide a linear reciprocating flux reversal PM machine, which can be easily manufactured by using a rectangular laminated core instead of a cylindrical laminated core, and can prevent an adhesive part from being removed from a mover and being damaged and decrease the weight of the machine by disposing magnets in the mover instead of around the mover.

In order to accomplish the above object, the present invention provides a linear reciprocating flux reversal Permanent Magnetic (PM) machine, comprising: a pair of stators arranged to be opposite to each other, the stators each having two coils wound in opposite directions, and air gap sections and interpole sections alternately arranged on inside portions of the stator in a crosswise direction of the stator with the air gap sections of a first stator opposite to interpole sections of a second stator; a mover disposed between the stators to be reciprocated therebetween, the mover having one or more bar-shaped magnets longitudinally and vertically embedded therein; and means for returning the mover to an initial position thereof, the returning means being connected to one or both ends of the mover.

The air gap sections and the interpole sections are implemented by forming grooves on inside portions of the stators.

It is preferable that the magnets embedded in the mover are arranged so that their poles having the same polarities confront each other.

In addition, it is preferable that the stators are each provided at a center of an inside portion thereof with a center groove to form two inside sub-portions to both sides of the center groove, and the coils are wound around the two inside sub-portions of the stator in opposite directions, respectively.

In addition, it is preferable that the returning means is a return spring having elastic force.

BRIEF DESCRIPTION OF THE DRAWINGS

The above and other objects, features and other advantages of the present invention will be more clearly understood from the following detailed description taken in conjunction with the accompanying drawings, in which;

FIG. 1 is a sectional view of a conventional moving magnet type linear reciprocating flux reversal PM machine;

FIG. 2 is a sectional view of a linear reciprocating flux reversal PM machine and a mover in accordance with the present invention;

FIG. 3 is a perspective view of the linear reciprocating flux reversal PM machine of the present invention;

FIG. 4 is a view illustrating the distribution of the lines of magnetic force when current is not applied to the coils of the linear reciprocating flux reversal PM machine of the present invention;

FIGS. 5A to 5C are views illustrating the distributions of the lines of magnetic force when current is applied to the coils of the linear reciprocating flux reversal PM machine of the present invention; and FIG. 6 shows a sine wave profile of the input current of the coils.

DESCRIPTION OF THE PREFERRED EMBODIMENTS

Reference now should be made to the drawings, in which the same reference numerals are used throughout the different drawings to designate the same or similar components.

Hereinafter, a preferred embodiment of the present invention is described in detail with reference to the companying drawings.

FIG. 2 is a sectional view of a linear reciprocating flux reversal PM machine in accordance with the present invention. FIG. 3 is a perspective view of the linear reciprocating flux reversal PM machine of the present invention.

As shown in FIGS. 2 and 3, the linear reciprocating flux reversal PM machine of the present invention comprises a first stator 10, a second stator 11, a mover 20 and a return spring 40.

The first and second stators 10 and 11 each have a center groove 50 at the center of the inside portion of the stator 10 or 11 that confronts the mover 20. The center groove 50 divides the inside portion of the stator 10 or 11 into two inside sub-portions. Air gap sections X1 and interpole sections X2 having the same width are alternately arranged on the inside sub-portions to both sides of the center groove 50.

Two coils 30 are wound in opposite directions around the two inside sub-portions situated to the right and left of the center groove 50, respectively. For example, if a left coil 30 is wound in the clockwise direction, the right coil 30 is wound in the counter-clockwise direction.

The air gap sections X2 are formed by forming grooves on the stators 10 and 11 to a certain depth. As a result, the air gap sections X2 and the interpole sections X1 constitutes a toothed shape.

Additionally, as shown in the drawings, the first and second stators 10 and 11 are arranged so that the air gap sections X2 and interpole sections X1 of one stator are opposite to the interpole sections X1 and air gap sections X2 of the other stator, respectively. That is, the air gap sections X2 of the first stator 10 are opposite to the interpole sections X1 of the second stator 11, respectively, while the interpole sections X1 of the first stator 10 are opposite to the air gap sections X2 of the second stator 11, respectively.

The mover 20 of the linear reciprocating flux reversal PM machine of the present invention is formed to have a rectangular shape differently from the cylindrical movers of conventional reciprocating flux reversal PM machines. In more detail, the mover 20 is shaped in the form of a long stick. Magnets M1, M2, M3, . . . are arranged in the mover 20 at regular intervals in the longitudinal direction of the mover 20.

In particular, the magnets M1, M2, M3, . . . are arranged with the N poles thereof opposite to each other and the S poles thereof opposite to each other, as shown FIG. 2. If the magnets M1, M2, M3, . . . are arranged with the N polers thereof opposite to the S poles thereof, the lines of magnetic force are generated in parallel with each other, which does not accord with the inventive concept of the present invention to use force caused by the difference in magnetic flux density.

Each of the first and second stators 10 and 11 and the mover 20 is not formed of a single metallic body, but by stacking a plurality of thin metallic plates.

As shown in FIG. 3, the widths of the interpole sections X1 of the stators 10 and 11, the widths of the air gap sections X2 of the stators 10 and 11, and the distances X3 between each pair of magnets of the mover 20 are the same.

The return spring 40 is connected to one end of the mover 20 so as to return the mover 20.

Hereinafter, there is described the operation of the linear reciprocating flux reversal PM machine of the present invention constructed as described above.

FIG. 4 is a schematic view illustrating the distribution of the lines of magnetic force when current is not applied to the coils of the linear reciprocating flux reversal PM machine of the present invention.

As shown in FIG. 4, when current is not applied to the coils 30, the lines of magnetic force generated by the magnets are mostly formed through the interpole sections X1 of the stators 10 and 11. Since air gap sections X2 are spaces filled with air rather than metal, such as iron, and air has a magnetic permeability lower than that of the metal, the lines of magnetic force generated by the magnets mostly pass through not the air gap sections X2 filled with air but the interpole sections X1 formed of metal.

Referring to the enlarged view of FIG. 4, a magnet M1 of the mover 20 is positioned at point "b" that is the center of an interpole section X1 of the mover 20 when current is not applied to the coils 30.

FIGS. 5A to 5C are views illustrating the distribution of the lines of magnetic force when alternating current (AC) is applied to the coils 30. The case where sine waveform current is employed is described below.

First, the variations of the lines of magnetic force in the interval of 0 to $\pi/2$ of the sine wave are described. When the current is applied to the coils 30, magnetic field is generated. If the coils 30 are wound as shown in FIG. 5A, the lines of the magnetic force is formed in the direction from the second stator 11 to the first stator 10.

Accordingly, the lines of magnetic force generated by the magnets are added to the lines of magnetic force generated by the current of the coils 30. At this time, the lines of magnetic force with the same directions are added to one another at some portions, while the lines of magnetic force with opposite directions are added to one another at other portions. Accordingly, magnetic flux density is increased in the case where the lines of magnetic force with the same direction are added, while the magnetic flux density is decreased in the case where the lines of magnetic force with opposite directions are added.

In part "c" of FIG. 5B, the lines of magnetic force generated by the current of the coils 30 and the magnets are directed from the second stator 11 to the first stator 10, so the lines of magnetic force with the same direction are added, thus increasing magnetic flux density. In contrast, in part "a" of FIG. 5B, the lines of magnetic force generated by the current of the coils 30 are directed from the second stator 11 to the first stator 10 while the lines of magnetic force generated by the magnets are directed from the first stator 10 to the second stator 11, so the lines of magnetic force with opposite directions are added, thus decreasing magnetic flux density.

Due to this imbalance of the magnetic flux density, the mover 20 experiences force in the direction from a position with high magnetic flux density to a position with low magnetic flux density, that is, the mover experiences force in the direction from part "c" with high magnetic flux density to part "a" with low magnetic flux density, so the magnet M1 of the mover 20 moves to part "a".

If the magnet M1 of the mover 20 moves to part "a", the imbalance of the magnetic flux density does not exist in the interpole section X1 any more and the mover 20 does not move any more.

Next, the variations of the lines of magnetic force in the interval of $\pi/2$ to $\pi$ of the sine wave are described. If the tensile force of the return spring 40 is appropriately regulated, the mover 20, which has been moved to the left by the imbalance of the magnet flux density, can be moved to the right by controlling the restoring force of the return spring 40 to be larger than the force caused by the imbalance of the magnet flux density from a certain point above $\pi/2$ of the sine wave.

At the $\pi$ point of the sine wave having a magnitude of 0, no imbalance of the magnetic flux density occurs, so the mover 20 is stopped so that the magnet M1 of the mover 20 reaches initial position b1.

Next, in the interval of $\pi$ to $3\pi/2$ of the sine wave, the direction of the current of the coils 30 and the direction of the lines of the magnetic force are reversed in comparison with those in the interval of 0 to $\pi/2$ of the sine wave. That is, the lines of the magnetic force generated by the current of the coils 30 are directed from the first stator 10 to the second stator 11.

In part "a" of FIG. 5C, the lines of magnetic force generated by the current of the coils 30 and the magnets are directed from the first stator 10 to the second stator 11, so the lines of magnetic force with the same directions are added to one another, thus increasing magnetic flux density. In contrast, in part "c" of FIG. 5B, the lines of magnetic force generated by the current of the coils 30 are directed from the first stator 10 to the second stator 11 and the lines of magnetic force generated by the magnets are directed from the second stator 11 to the first stator 10, so the lines of magnetic force with other directions are added to one another, thus decreasing magnetic flux density.

Due to this imbalance of the magnetic flux density, the mover 20 experiences force in the direction from a position with high magnetic flux density to a position with low magnetic flux density, that is, the mover experiences force in the direction from part "a" with high magnetic flux density to part "c" with low magnetic flux density, so the magnet M1 of the mover 20 is moved to part "c".

If the magnet M1 of the mover 20 is moved to part "c", the imbalance of the magnetic flux density does not exist in the interpole section X1 any more and the mover 20 is not moved any more.

Lastly, Next, the variations of the lines of magnetic force in the interval of $3\pi/2$ to $2\pi$ of the sine wave are described. If the tensile force of the return spring 40 is appropriately regulated, the mover 20, which has been moved to the right by the imbalance of the magnet flux density, can be moved to the left by controlling the restoring force of the return spring 40 to be larger than the force caused by the imbalance of the magnet flux density from a certain point in the interval above $3\pi/2$ of the sine wave.

At the $2\pi$ point of the sine wave having a magnitude of 0, no imbalance of the magnetic flux density occurs, so the mover 20 is stopped so that the magnet M1 of the mover 20 reaches initial position "b".

As sine waveform input current is periodically applied to the of the coils 30, the above-described operation in which the magnets are moved is periodically repeated, so the mover 20 carries out a periodical reciprocating motion.

As described above, the present invention provides a linear reciprocating flux reversal PM machine, in which a plurality of magnets rather than a single magnet are inserted in the mover, thereby efficiently aggregating magnetic flux.

Additionally, since the stators of the present invention do not entirely surround the mover, a thin and small linear reciprocating flux reversal PM machine can be manufactured. Additionally, since the bar-shaped magnets smaller than the conventional single cylindrical magnet are employed, the weight of the mover is decreased, thus increasing the reciprocating frequency of the mover.

Additionally, since the magnets are constructed to be embedded in the mover, the magnets can be easily attached, and are not easily detached, thus improving the durability of the linear reciprocating flux reversal PM machine.

Moreover, since the stators as well as the mover of the linear reciprocating flux reversal PM machine can be formed to have rectangular shapes rather than conventional cylindrical shapes, it is easy to stack the layers of the stators and the mover at the time of manufacturing the stators and the mover, thereby easily manufacturing the machine and decreasing the manufacturing cost of the machine.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claim is:

1. A linear reciprocating flux reversal Permanent Magnetic (PM) machine, comprising:

a pair of stators arranged to be opposite to each other, the stators each having two coils wound in opposite directions, and air gap sections and interpole sections alternately arranged on inside portions of the stator in a crosswise direction of the stator with the air gap sections of a first stator opposite to interpole sections of a second stator;

a mover disposed between the stators to be reciprocated therebetween, the mover having one or more bar-shaped magnets longitudinally and vertically embedded therein; and means for returning the mover to an initial position thereof, the returning means being connected to one or both ends of the mover.

2. The machine according to claim 1, wherein the air gap sections and the interpole sections are implemented by forming grooves on inside portions of the stators.

3. The according to claim 1, wherein the magnets embedded in the mover are arranged so that their poles having the same polarities confront each other.

4. The according to claim 1, wherein the stators are each provided at a center of an inside portion thereof with a center groove to form two inside sub-portions to both sides of the center groove, and the coils are wound around the two inside sub-portions of the stator in opposite directions, respectively.

5. The according to claim 1, wherein the returning means is a return spring having elastic force.

* * * * *